United States Patent
Fahn et al.

(10) Patent No.: US 8,067,682 B2
(45) Date of Patent: Nov. 29, 2011

(54) MUSIC SCORE RECOGNITION METHOD AND SYSTEM THEREOF

(75) Inventors: Chin-Shyurng Fahn, Taipei (TW); Kai-Jay Lu, Taichung County (TW)

(73) Assignee: National Taiwan University of Science and Technology, Taipei (TW)

( * ) Notice: Subject to any disclaimer, the term of this patent is extended or adjusted under 35 U.S.C. 154(b) by 160 days.

(21) Appl. No.: 12/548,440

(22) Filed: Aug. 27, 2009

(65) Prior Publication Data
US 2010/0313737 A1    Dec. 16, 2010

(30) Foreign Application Priority Data
Jun. 12, 2009 (TW) .............................. 98119721 A

(51) Int. Cl.
A63H 5/00 (2006.01)
G10H 1/32 (2006.01)

(52) U.S. Cl. ................ 84/616; 84/609; 84/615; 84/644; 84/649

(58) Field of Classification Search ...................... 84/616
See application file for complete search history.

(56) References Cited

U.S. PATENT DOCUMENTS

| 5,492,049 A * | 2/1996 | Aoki et al. ....................... 84/611 |
| 6,137,041 A * | 10/2000 | Nakano ........................ 84/470 R |
| 2008/0024612 A1 * | 1/2008 | Oya et al. ................... 348/207.1 |

* cited by examiner

*Primary Examiner* — Elvin G Enad
*Assistant Examiner* — Christopher Uhlir
(74) *Attorney, Agent, or Firm* — Jianq Chyun IP Office

(57) ABSTRACT

A music score recognition method and a system thereof are provided. In the present method, a music score is detected and at least one measure in the music score is obtained by searching bar lines, so as to plan a recognition order according to the position of each measure in the music score. Next, an image capturing apparatus is controlled to capture one of the measures according to the recognition order, and music information in the captured measure is recognized and outputted immediately. The method follows the recognition order to repeatedly perform the steps of controlling the image apparatus, recognizing the captured measure, and outputting the music information on the other measures until each of the measures has been processed.

40 Claims, 3 Drawing Sheets

MUSIC SCORE RECOGNITION METHOD AND SYSTEM THEREOF

CROSS-REFERENCE TO RELATED APPLICATION

This application claims the priority benefit of Taiwan application serial no. 98119721, filed on Jun. 12, 2009. The entirety of the above-mentioned patent application is hereby incorporated by reference herein and made a part of specification.

BACKGROUND OF THE INVENTION

1. Field of the Invention

The present invention generally relates to a method for recognizing music scores, and more particularly, to a method capable of recognizing all kinds of music scores immediately and a system thereof.

2. Description of Related Art

Along with the thriving development of the information technology (IT), the computer technology has been widely applied to various fields. Accordingly, the scope of the information technology industry becomes much wider, wherein the music score recognition technology is a technology which combines the image processing technology with the music art.

In the current optical music recognition (OMR) technology, a complete music score is generally scanned as an image file through a scanner, and the music information in the complete music score is then recognized. After the complete music score is recognized, the music information is converted to a format which is readable for robots, and further, the electrical piano or the other electrical musical instruments are controlled to play. However, the above-described method simply outputs a recognized result until the music score is completely recognized. In other words, users necessarily operate the scanner and spend much time for waiting the recognition result. After that, it is possible to listen to the played music. Moreover, due to operating environments of the scanner, the above-described method simply recognize a flat music score without twists, folds, or turns. The object to be recognized will be limited through scanning the music scores, and it usually spends much time for waiting.

Another related art to recognize music scores is that the music information of a predetermined music score is directly recorded in an optical disk and the like. When the electrical piano or the other electrical musical instruments read the optical disk, the music information recorded in the optical disk is directly converted to the hardware signals that control the electrical piano to play. However, it is highly inflexible that the electrical piano simply plays the predetermined music score with the above-described method. Meanwhile, it can not achieve the purposes of freely selecting music scores by users and immediately recognizing the music scores with the above-described method.

SUMMARY OF THE INVENTION

Accordingly, a music score recognition method is provided in an embodiment consistent with the present invention. The music score recognition method is capable of recognizing all kinds of music scores immediately to simulate a manner in which human being reads the music scores.

A music score recognition system is provided in an embodiment consistent with the present invention. The music score recognition system recognizes the music scores in a unit of measures and outputs a recognition result immediately to enhance the efficiency of recognizing the music scores.

A music score recognition method adapted for a computer system including an image capturing apparatus is provided in an embodiment consistent with the present invention. First of all, a music score is detected, a bar line is searched to obtain at least one measure in the music score, and further, a recognition order is planned according to the positions of the measures in the music score with the music score recognition method. Next, the image capturing apparatus is controlled to capture one of the measures according to the recognition order, at least one music information in the captured measure is recognized, and the music information is outputted. The steps of controlling the image capturing apparatus, recognizing the captured measure, and outputting the music information on the other ones of the measures are performed until each of the measures has been processed with the music score recognition method.

In an embodiment of the present invention, the step of detecting the music score includes the following steps. An image including a file is captured by means of the image capturing apparatus. Next, whether the file satisfies a musical form or not is determined. And the file is determined to be the music score when the file satisfies the musical form.

In an embodiment of the present invention, before the step of capturing the image using the image capturing apparatus, the music score recognition method further includes a step of adjusting an angle of a lens of the image capturing apparatus to an initial position.

In an embodiment of the present invention, the step of determining whether the file satisfies the musical form or not includes the following steps. An edge detection operation is performed on the image to obtain a plurality of candidate units. Next, whether each of the candidate units is a music score unit or not is determined according to the musical form and geometric information of each of the candidate units. It is determined that the file satisfies the musical form if one or more than one of the music score units exit.

In an embodiment of the present invention, the geometric information of each of the candidate units includes the positions of four vertices, a unitary area, a unitary height, and a unitary width. The step of determining whether each of the candidate units is the music score unit or not according to the musical form and the geometric information includes at least one of the following steps. It is determined that the candidate unit is not the music score unit if the unitary area of the candidate unit is less than a first predetermined value. It is determined that the candidate unit is not the music score unit if the unitary height of the candidate unit is greater than a second predetermined value. It is determined that the candidate unit is not the music score unit if any one of the positions of four vertices of the candidate unit is located in a specific area. It is determined that the candidate unit is not the music score unit if a ratio of the unitary height to the unitary width of the candidate unit is not equal to a third predetermined value. Wherein, the first predetermined value is proportional to an image area of the image just containing the candidate unit, and the second predetermined value is proportional to an image height of the image just containing the candidate unit.

In an embodiment of the present invention, after the step of determining whether each of the candidate units is the music score unit or not, the music score recognition method further includes a step of determining that the file does not satisfy the musical form if a distance between the two neighboring music score units is not equal to a fourth predetermined value.

In an embodiment of the present invention, the bar line is a vertical line passing through one of the music score units.

In an embodiment of the present invention, after the step of searching the bar line to obtain the measures in the music score, the music score recognition method further includes a step of calculating an amount of the measures.

In an embodiment of the present invention, the step of planning the recognition order according to the positions of the measures in the music score further includes the following steps. A turning angle of a lens of the image capturing apparatus turning from an initial position to the center position of each of the measures is calculated, and the corresponding relations of the measures and the turning angles corresponding thereto are recorded. Wherein, the turning angle comprises a horizontal angle and/or a vertical angle.

In an embodiment of the present invention, the steps of controlling the image capturing apparatus to capture one of the measures according to the recognition order and recognizing the music information in the captured measure include the following steps. One of the measures is selected according to the recognition order. Next, the turning angle corresponding to the selected measure is obtained, the lens of the image capturing apparatus is controlled to turn the turning angle to target on the center position of the selected measure, and further, the lens is zoomed in to capture an enlarged frame of the selected measure. Finally, the music information in the enlarged frame is recognized.

In an embodiment of the present invention, the music information includes musical notes, clefs, rests, accidentals, time signatures, and dots.

In an embodiment of the present invention, wherein the step of outputting the music information comprises calculating a turning angle of a lens of the image capturing apparatus turning from an initial position to the center position of each of the measures, and recording the corresponding relations of the measures and the turning angles corresponding thereto. The sound file format includes a musical instrument digital interface (MIDI) format.

In an embodiment of the present invention, the step of outputting the music information includes the following steps. The music information of the captured measure is converted to a plurality of hardware signals, and an electrical musical instrument is controlled to play the music information using the hardware signals.

In an embodiment of the present invention, the step of outputting the music information includes a step of storing the music information as a temporary file corresponding to the captured measure. After each of the measures has been processed, the music score recognition method further includes a step of combining all of the stored temporary files as an information file corresponding to the complete music score.

In an embodiment of the present invention, the image capturing apparatus includes a pan-tilt-zoom (PTZ) camera, and the music score is a piano score, a stringed instrument score, a wind instrument score, or a full score.

A music score recognition system is also provided in an embodiment consistent with the present invention. The music score recognition system includes an image capturing apparatus and a processing unit coupled thereto, wherein the processing unit searches a bar line to obtain at least one measure in a music score when the music score is detected and plans a recognition order according to the positions of the measures in the music score. The processing unit controls the image capturing apparatus to capture one of the measures according to the recognition order, recognizes at least one music information in the captured measure, and outputs the music information. The processing unit performs the above-described procedures of controlling, recognizing, and outputting on other ones of the measures until each of the measures has been processed.

In an embodiment of the present invention, the processing unit determines whether a file satisfies a musical form or not after the image capturing apparatus captures an image including the file, and the processing unit determines that the file is the music score when the file satisfies the musical form. Wherein, the processing unit adjusts an angle of a lens of the image capturing apparatus to an initial position before the image capturing apparatus captures the image.

In an embodiment of the present invention, the processing unit performs an edge detection operation on the image to obtain a plurality of candidate units, determines whether each of the candidate units is a music score unit or not according to the musical form and geometric information of each of the candidate units, and determines that the file satisfies the musical form when one or more than one of the music score units exit.

In an embodiment of the present invention, the geometric information of each of the candidate units includes the positions of four vertices, a unitary area, a unitary height, and a unitary width. The processing unit determines that the candidate unit is not the music score unit when the unitary area of the candidate unit is less than a first predetermined value, determines that the candidate unit is not the music score unit when the unitary height of the candidate unit is greater than a second predetermined value, determines that the candidate unit is not the music score unit when any one of the positions of the four vertices of the candidate unit is located in a specific area, and determines that the candidate unit is not the music score unit when a ratio of the unitary height to the unitary width of the candidate unit is not equal to a third predetermined value. Wherein, the first predetermined value is proportional to an image area of the image just containing the candidate unit, and the second predetermined value is proportional to an image height of the image just containing the candidate unit.

In an embodiment of the present invention, the processing unit determines that the file does not satisfy the musical form when a distance between the two neighboring music score units is not equal to a fourth predetermined value.

In an embodiment of the present invention, the bar line is a vertical line passing through one of the music score units.

In an embodiment of the present invention, the processing unit calculates an amount of the measures and obtains a center position of each of the measures. The processing unit calculates a turning angle of a lens of the image capturing apparatus turning from an initial position to the center position of each of the measures and records the corresponding relations of the measures and the turning angles corresponding thereto. Wherein, the turning angle is a horizontal angle and/or a vertical angle.

In an embodiment of the present invention, the processing unit selects one of the measures according to the recognition order, obtains the turning angle corresponding to the selected measure, and controls the lens of the image capturing apparatus to turn the turning angle to target on the center position of the selected measure. The image capturing apparatus zooms in the lens to capture an enlarged frame of the selected measure, and further, the processing unit recognizes the music information in the enlarged frame.

In an embodiment of the present invention, the music information includes musical notes, clefs, rests, accidentals, time signatures, and dots.

In an embodiment of the present invention, the processing unit converts the music information of the captured measure to a sound file format and plays the music information converted to the sound file format. Wherein, the sound file format includes a musical instrument digital interface (MIDI) format.

In an embodiment of the present invention, the processing unit converts the music information of the captured measure to a plurality of hardware signals and controls an electrical musical instrument to play the music information using the hardware signals.

In an embodiment of the present invention, the processing unit stores the music information as a temporary file corresponding to the captured measure. The processing unit combines all of the stored temporary files as an information file corresponding to the complete music score.

In an embodiment of the present invention, the image capturing apparatus includes a pan-tilt-zoom (PTZ) camera, and the music score is a piano score, a stringed instrument score, a wind instrument score, or a fall score.

In view of the above, the music score recognition system recognizes the music information in the music scores by taking a measure as a recognition unit, and outputs the recognition result of each unit immediately. In consequence, not only the efficiency of recognizing the music scores is enhanced, but also the manner of reading the music score by human being can be simulated.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
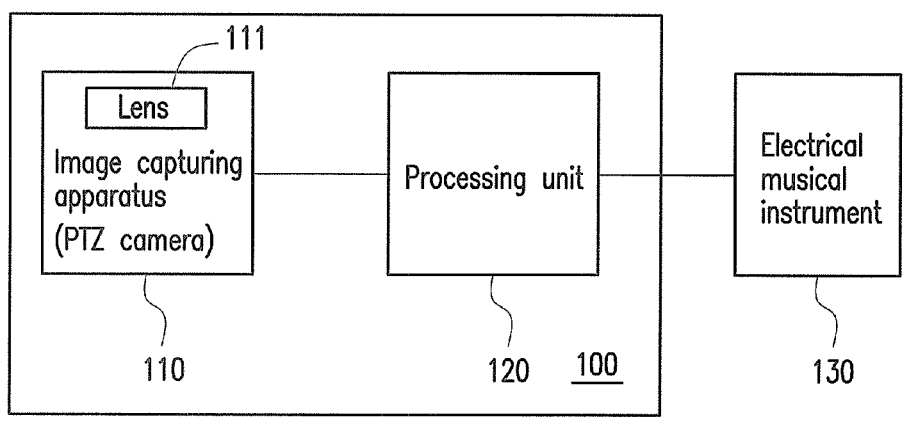
FIG. 1 is the block diagram of a music score recognition system according to an embodiment of the present invention.

FIG. 1 is the block diagram of a music score recognition system according to an embodiment of the present invention. Referring to FIG. 1, the music score recognition system 100 includes an image capturing apparatus 110 and a processing unit 120, wherein the image capturing apparatus 110 is, for example, a pan-tilt-zoom (PTZ) camera having a lens 111 with a large panning or tilting angle, auto-focusing, and a high zooming ratio. The processing unit 120 coupled to the image capturing apparatus 110 is, for example, a piece of hardware having capabilities of information processing (e.g., a chipset), a software component, or a combination thereof. However, the present invention is not limited thereto.

The processing unit 120 immediately detects a file put in front of the image capturing apparatus 110, determines whether the file is a music score or not, and analyzes a form of the music score to plan a recognition order by a unit of measures. Next, the processing unit 120 controls the image capturing apparatus 110 to adjust the lens 111 thereof to capture one of the measures according to the recognition order. Consequently, the processing unit 120 recognizes the music information in the captured measure, and outputs a recognition result. After recognizing the captured measure and outputting the recognition result, the processing unit 120 further controls the image capturing apparatus 120 to capture another measure according to the recognition order and repeatedly processes the procedures of recognizing the captured measure and outputting the music information by a unit of measures until all of the measures have been processed.

In an embodiment, the music score recognition system 100 may be disposed by a computer system. In an embodiment, the music score recognition system 100 may be realized in an entertainment robot. Through the music score recognition system 100, not only all kinds of music scores can be recognized, but also the recognition results will be presented immediately, so that the efficiency of recognizing the music scores is enhanced. When the music score recognition system 100 is realized in the entertainment robot, the entertainment robot can simulate a manner in which human being analyzes parts of the music scores while reading since the music score recognition system 100 immediately outputs the recognition results after recognizing the music information of each of the measures.

Figure 2:
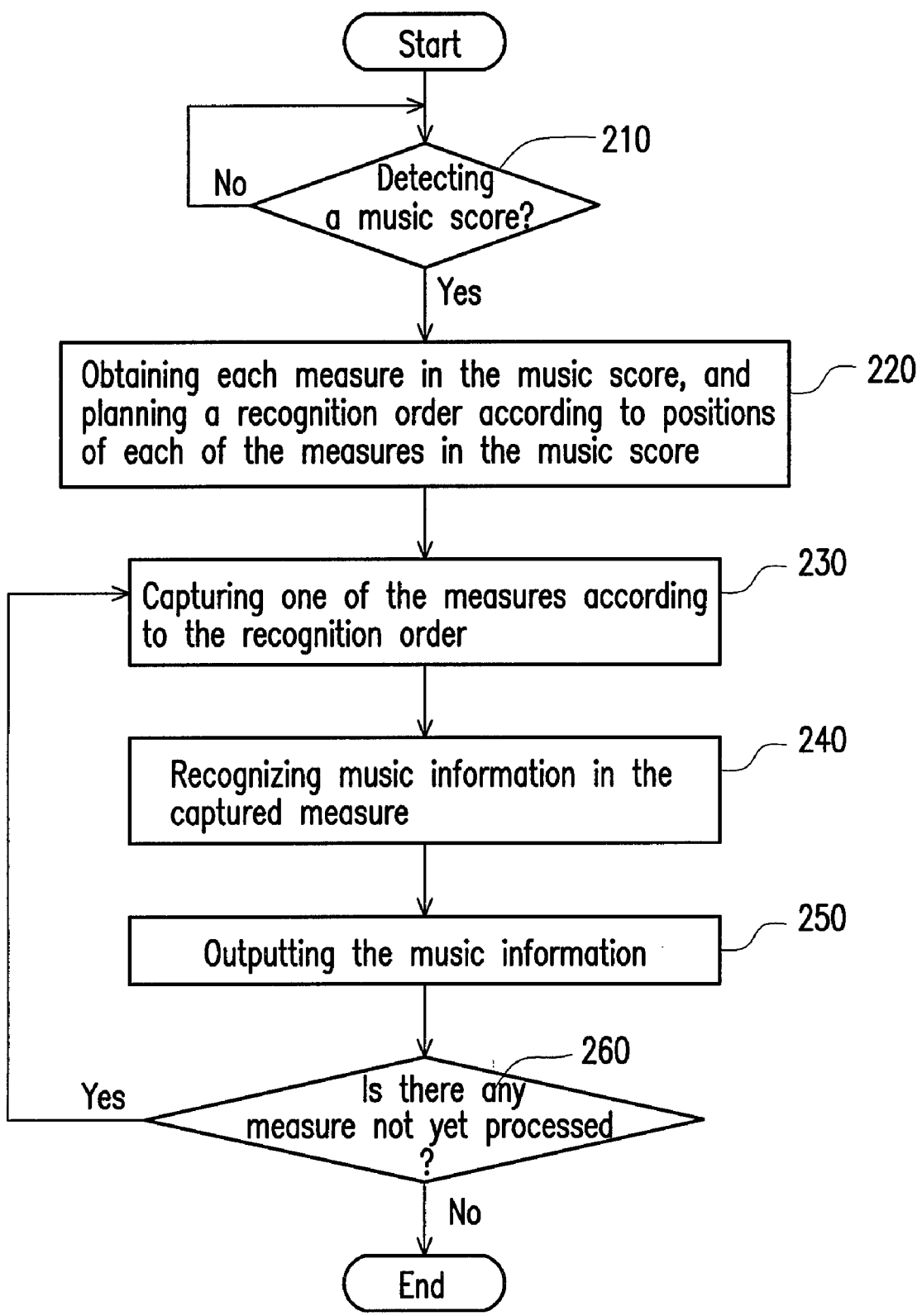
FIG. 2 is the flowchart of a music score recognition method according to an embodiment of the present invention.

In order to further illustrate the operation of the music score recognition system 100, another embodiment is enumerated for more detailed description below. FIG. 2 is the flowchart of a music score recognition method according to an embodiment of the present invention. Referring to FIG. 1 and FIG. 2, first of all, the processing unit 120 determines whether or not a music score is detected at present as shown in Step 210. That is, the processing unit 120 determines whether a file put in front of the image capturing apparatus 110 is a music score or not.

Figure 3:
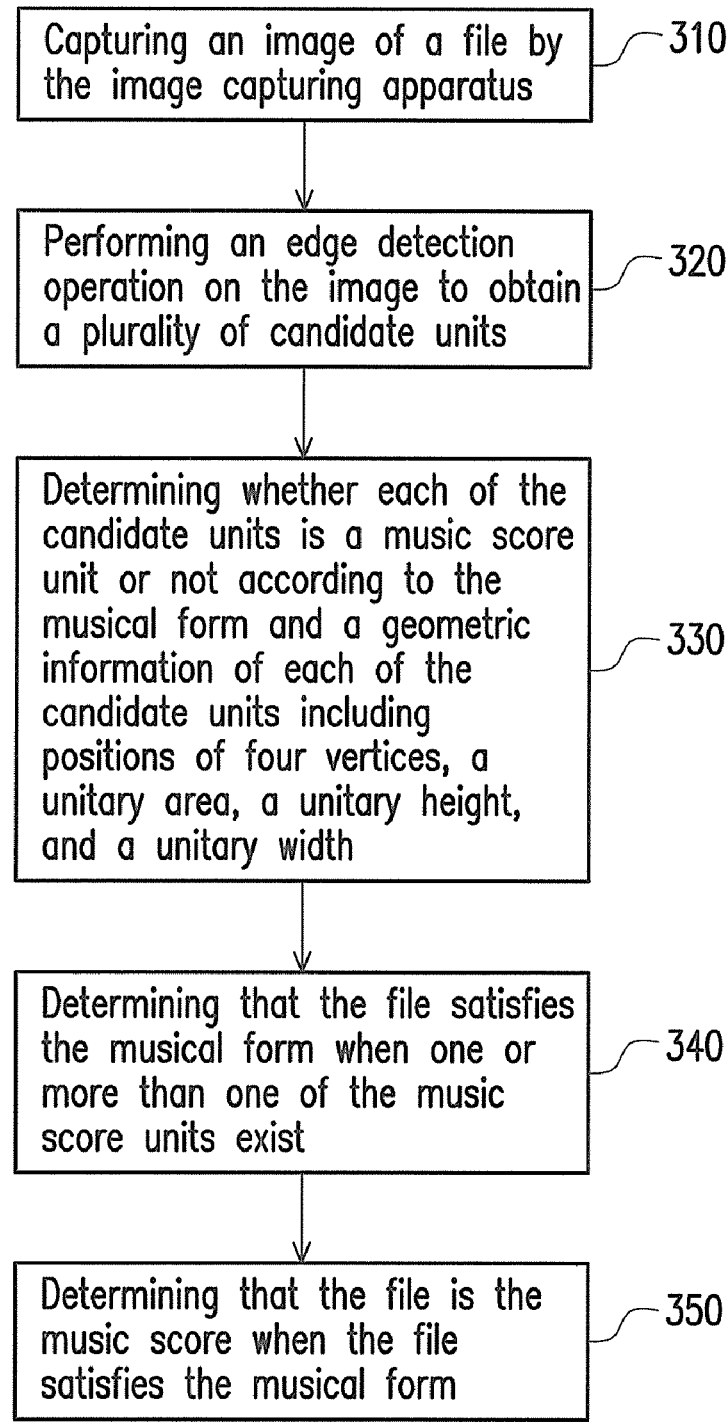
FIG. 3 is the flowchart of detecting the music score according to an embodiment of the present invention.

In order to insure that the image capturing apparatus 110 successfully captures a front image for the following decision, the processing unit 120 adjusts the lens 111 of the image capturing apparatus 110 at first, so that an angle of the lens 111 is turned to an initial position. Referring to FIG. 3, in Step 310, when the image capturing apparatus 110 captures the image of the file, the processing unit 120 determines whether the file satisfies a musical form or not, and determines that the file is the music score when the file satisfies the musical form.

The step of determining whether the file satisfies the musical form or not will be described in detail as follows. In the present embodiment, the music score is a piano score, a stringed instrument score, a wind instrument score, or a full score. However, the present invention is not limited thereto. No matter what kind of instruments the music score is corresponding to, the music score should satisfy the form of having a staff and a musical note. Accordingly, in Step 320, when whether the file satisfies the musical form or not is determined, the processing unit 120 performs an edge detection operation on the image captured by the image capturing apparatus 110 at first, so as to obtain a plurality of edge points. Next, the processing unit 120 groups the edge points as a plurality of candidate units by use of the dilation operation in mathematical morphology followed by a connected component labeling algorithm. As a result, in Step 330, the processing unit 120 can determine whether each of the candidate units is a music score unit or not according to the musical form and geometric information of each of the candidate units. If one or more than one of the music score units exit, the processing unit 120 determines that the file in the image satisfies the musical form (Step 340), and determines that the file is the music score when the file satisfies the musical form (Step 350).

Specifically, the geometric information of each of the candidate units includes the positions of four vertices, a unitary area, a unitary height, and a unitary width. The processing unit 120 determines that the candidate unit is not the music score unit if the unitary area of the candidate unit is less than a first predetermined value, wherein the first predetermined value is proportional to an image area of the image just containing the candidate unit. In other words, the candidate unit having a too small unitary area is not the unit constituting the music score, so that the processing unit 120 deletes the foregoing candidate unit. Moreover, the processing unit 120 determines that the candidate unit is not the music score unit if the unitary height of the candidate unit is greater than a second predetermined value, wherein the second predetermined value is proportional to an image height of the image just containing the candidate unit. That is, the candidate unit having a too large unitary height is not the unit constituting the music score, so that the processing unit 120 also deletes this kind of candidate units. In another embodiment, in order to delete the background and the parts having incomplete forms cut by the fringes of the image, the processing unit 120 determines that the candidate unit is not the music score unit if any one of the positions of four vertices of the candidate unit is located in a specific area (e.g., a marginal area). Furthermore, since each of the staves in the music score has a specific height-width ratio, the processing unit 120 determines that the candidate unit is not the music score unit if a ratio of the unitary height to the unitary width of the candidate unit is not equal to a third predetermined value.

If the file put in front of the image capturing apparatus 110 is the music score, each of the staves in the music score is determined as the music score unit after being determined according to the above-described process. In an embodiment, the processing unit 120 determines that the file does not satisfy the musical form if a distance between the two neighboring music score units is not equal to a fourth predetermined value.

Only when the processing unit 120 determines the file satisfying the musical form, the detected file is determined as the music score. However, if no music score is detected, Step 210 is repeated. On the contrary, if the music score is detected, the processing unit 120 obtains each of the measures in the music score and further plans the recognition order by a unit of measures according to a position of each of the measures in the music score, as shown in Step 220. Since a bar line is a vertical line passing through one of the music score units, the processing unit 120 searches the bar line in each of the music score units to obtain the position of each of the measures. As a result, the processing unit 120 can obtain an amount of the measures and a center position of each of the measures. In the present embodiment, the processing unit 120 further calculates a turning angle of the lens 111 of the image capturing apparatus 110 for turning the lens 111 from the initial position to target on the center position of each of the measures, and the processing unit 120 records the corresponding relations of each of the measures and the turning angles corresponding thereto. In this embodiment, the turning angle comprises a horizontal angle and/or a vertical angle.

Next, the processing unit 120 controls the image capturing apparatus 110 to capture one of the measures according to the recognition order, as shown in Step 230. In an embodiment of the present invention, after selecting one of the measures to be processed according to the recognition order, the processing unit 120 obtains the turning angle corresponding to the selected measure. Meanwhile, the processing unit 120 controls the lens 111 of the image capturing apparatus 110 to turn the above-described turning angle to target on the center position of the selected measure. Subsequently, the image capturing apparatus 110 zooms in the lens 111 to capture an enlarged frame of the selected measure in allowable focus. In consequence, the image capturing apparatus 110 can obtain a clear enlarged frame of the measure which is a part frame thereof.

In Step 240, the processing unit 120 recognizes the enlarged frame captured by the image capturing apparatus 110 in Step 230 to obtain at least one music information in the measure, wherein the music information includes musical notes, clefs, rests, accidentals, time signatures, dots, and the like. In the present embodiment, since the processing unit 120 also has a processing method for determining twisted lines, the processing unit 120 can recognize correct music information.

After recognizing music information in a measure, the processing unit 120 outputs the music information immediately, as shown in Step 250. In an embodiment, the processing unit 120 converts the music information of the captured measure to a sound file format and plays the music information converted to the sound file format for users. Wherein, the sound file format includes a musical instrument digital interface (MIDI) format. In another embodiment, the processing unit 120 converts the music information of the captured measure to a plurality of hardware signals, and controls an electrical musical instrument 130, such as an electrical piano, to play the music information or a robot to play it using the above-described hardware signals. In other words, after recognizing the music information in the measure, the processing unit 120 can present the recognized music information in the measure immediately.

In another embodiment, the processing unit 120 may store the music information as a temporary file corresponding to each of the measures. Until the music score, i.e., all of the measures, has been recognized, the processing unit 120 combines all of the stored temporary files corresponding to each of the measures as an information file corresponding to the complete music score.

Finally, in Step 260, the processing unit 120 judges whether there is any unprocessed measure. If yes, the processing flow returns to Step 230. Accordingly, the processing unit 120 obtains the other ones of the measures according to the recognition order again and repeatedly performs Step 240 through Step 260 on the measures until all of the measures have been processed. Through each of the steps shown in FIG. 2, the image capturing apparatus 110 captures the enlarged frame of each of the measures in the music score according to the recognition order, so that the processing unit 120 recognizes the music information thereof and outputs the music information immediately. After one measure has been recognized, the image capturing apparatus 110 moves to the next measure, and the music score recognition system 100 repeatedly performs the procedures of recognizing the captured measure and outputting the music information. As a result, the manner of immediately reading the music score is simulated.

To sum up, all kinds of music scores can be recognized by the music score recognition method and the system thereof. Using each measure as a unit for recognizing the music score achieves better recognition efficiency. Moreover, the music information of the measure can be immediately outputted after each recognition process. Accordingly, the efficiency of recognizing the music score is highly enhanced, and the method and system of the present invention that can simultaneously output music after recognizing the music score in each unit are much closer to the manner in which human being reads the music score.

Although the present invention has been described with reference to the above embodiments, it will be apparent to one of the ordinary skills in the art that modifications to the described embodiment may be made without departing from the spirit of the invention. Accordingly, the scope of the invention will be defined by the attached claims not by the above detailed descriptions.

What is claimed is:

1. A music score recognition method, adapted for a computer system comprising an image capturing apparatus, the music score recognition method comprising the steps of:
   detecting a music score;
   searching a bar line to obtain at least one measure in the music score;
   calculating an amount of the obtained at least one measure;
   obtaining a center position of each of the obtained at least one measure;
   planning a recognition order according to positions of the at least one measure in the music score, wherein the step of planning the recognition order according to the positions of the at least one measure in the music score further comprises;
      calculating a turning angle of a lens of the image capturing apparatus for turning the lens from an initial position to target on the center position of each of the at least one measure; and
      recording corresponding relations of the at least one measure and the turning angles corresponding thereto;
   controlling the image capturing apparatus to capture one of the at least one measure according to the recognition order;
   recognizing at least one music information in the captured measure;
   outputting the music information; and
   performing the steps of controlling the image capturing apparatus, recognizing the captured measure, and outputting the music information on other ones of the at least one measure until each of the at least one measure has been processed.

2. The music score recognition method as claimed in claim 1, wherein the step of detecting the music score comprises:
   capturing an image of a file by means of the image capturing apparatus;
   determining whether the file satisfies a musical form or not; and
   determining that the file is the music score when the file satisfies the musical form.

3. The music score recognition method as claimed in claim 2, wherein before the step of capturing the image by means of the image capturing apparatus, the music score recognition method further comprises:
   adjusting an angle of the lens of the image capturing apparatus to an initial position.

4. The music score recognition method as claimed in claim 2, wherein the step of determining whether the file satisfies the musical form or not comprises:
   performing an edge detection operation on the image to obtain a plurality of candidate units;
   determining whether each of the candidate units is a music score unit or not according to the musical form and a geometric information of each of the candidate units; and
   determining that the file satisfies the musical form when one or more than one of the music score units exist.

5. The music score recognition method as claimed in claim 4, wherein the geometric information of each of the candidate units comprises positions of four vertices, a unitary area, a unitary height, and a unitary width.

6. The music score recognition method as claimed in claim 5, wherein the step of determining whether each of the candidate units is the music score unit or not according to the musical form and the geometric information comprises at least one of the following steps:
   determining that the candidate unit is not the music score unit if the unitary area of the candidate unit is less than a first predetermined value;
   determining that the candidate unit is not the music score unit if the unitary height of the candidate unit is greater than a second predetermined value;
   determining that the candidate unit is not the music score unit if one of the positions of four vertices of the candidate unit is located in a specific area; and
   determining that the candidate unit is not the music score unit if a ratio of the unitary height to the unitary width of the candidate unit is not equal to a third predetermined value.

7. The music score recognition method as claimed in claim 6, wherein the first predetermined value is proportional to an image area of the image just containing the candidate unit.

8. The music score recognition method hod as claimed in claim 6, wherein the second predetermined value is proportional to an image height of the image just containing the candidate unit.

9. The music score recognition method as claimed in claim 4, wherein after the step of determining whether each of the candidate units is the music score unit or not, the music score recognition method further comprises:
   determining that the file does not satisfy the musical form if a distance between two neighboring music score units is not equal to a predetermined value.

10. The music score recognition method as claimed in claim 4, wherein the bar line is a vertical line passing through one of the music score units.

11. The music score recognition method as claimed in claim 1, wherein the turning angle comprises a horizontal angle and/or a vertical angle.

12. The music score recognition method as claimed in claim 1, wherein the steps of controlling the image capturing apparatus to capture one of the at least one measure according to the recognition order and recognizing the music information in the captured measure comprise:
   selecting one of the at least one measure according to the recognition order;
   obtaining the turning angle corresponding to the selected measure;
   controlling the lens of the image capturing apparatus to turn the turning angle to target on the center position of the selected measure;
   zooming in the lens to capture an enlarged frame of the selected measure; and
   recognizing the music information in the enlarged frame.

13. The music score recognition method as claimed in claim 1, wherein the music information comprises musical notes, clefs, rests, accidentals, time signatures, and dots.

14. The music score recognition method as claimed in claim 1, wherein the step of outputting the music information comprises:
   converting the music information of the captured measure to a sound file format; and
   playing the music information converted to the sound file format.

15. The music score recognition method as claimed in claim 14, wherein the sound file format comprises a musical instrument digital interface (MIDI) format.

16. The music score recognition method as claimed in claim 1, wherein the step of outputting the music information comprises:
 converting the music information of the captured measure to a plurality of hardware signals; and
 controlling an electrical musical instrument to play the music information using the hardware signals.

17. The music score recognition method as claimed in claim 1, wherein the step of outputting the music information comprises:
 storing the music information as a temporary file corresponding to the captured measure.

18. The music score recognition method as claimed in claim 17, wherein after each of the at least one measure has been processed, the music score recognition method further comprises:
 combining all of the stored temporary files as an information file corresponding to a complete music score.

19. The music score recognition method as claimed in claim 1, wherein the image capturing apparatus is a pan-tilt-zoom (PTZ) camera.

20. The music score recognition method as claimed in claim 1, wherein the music score is a piano score, a stringed instrument score, a wind instrument score, or a full score.

21. A music score recognition system comprising:
 an image capturing apparatus; and
 a processing unit coupled to the image capturing apparatus for searching a bar line to obtain at least one measure in a music score when the music score is detected, and planning a recognition order according to positions of the at least one measure in the music score,
 wherein the processing unit controls the image capturing apparatus to capture one of the at least one measure according to the recognition order, recognizes at least one music information in the captured measure, and outputs the music information,
 the processing unit performs the procedures of controlling the image capturing apparatus, recognizing the captured measure, and outputting the music information on other ones of the at least one measure until each of the at least one measure has been processed,
 the processing unit calculates an amount of the obtained at least one measure and obtains a center position of each of the obtained at least one measure,
 and the processing unit calculates a turning angle of a lens of the image capturing apparatus for turning the lens from an initial position to target on the center position of each of the at least one measure and records the corresponding relations of the at least one measure and the turning angles corresponding thereto.

22. The music score recognition system as claimed in claim 21, wherein the processing unit determines whether a file satisfies a musical form or not after the image capturing apparatus captures an image of the file, and the processing unit determines that the file is the music score when the file satisfies the musical form.

23. The music score recognition system as claimed in claim 22, wherein the processing unit adjusts an angle of the lens of the image capturing apparatus to an initial position before the image capturing apparatus captures the image.

24. The music score recognition system as claimed in claim 22, wherein the processing unit performs an edge detection operation on the image to obtain a plurality of candidate units, determines whether each of the candidate units is a music score unit or not according to the musical form and a geometric information of each of the candidate units, and determines that the file satisfies the musical form when one or more than one of the music score units exist.

25. The music score recognition system as claimed in claim 24, wherein the geometric information of each of the candidate units comprises positions of four vertices, a unitary area, a unitary height, and a unitary width.

26. The music score recognition system as claimed in claim 25, wherein the processing unit determines that the candidate unit is not the music score unit when the unitary area of the candidate unit is less than a first predetermined value, determines that the candidate unit is not the music score unit when the unitary height of the candidate unit is greater than a second predetermined value, determines that the candidate unit is not the music score unit when one of the positions of four vertices of the candidate unit is located in a specific area, and determines that the candidate unit is not the music score unit when a ratio of the unitary height to the unitary width of the candidate unit is not equal to a third predetermined value.

27. The music score recognition system as claimed in claim 26, wherein the first predetermined value is proportional to an image area of the image just containing the candidate unit.

28. The music score recognition system as claimed in claim 26, wherein the second predetermined value is proportional to an image height of the image just containing the candidate unit.

29. The music score recognition system as claimed in claim 24, wherein the processing unit determines that the file does not satisfy the musical form when a distance between two neighboring music score units is not equal to a predetermined value.

30. The music score recognition system as claimed in claim 24, wherein the bar line is a vertical line passing through one of the music score units.

31. The music score recognition system as claimed in claim 21, wherein the turning angle comprises a horizontal angle and/or a vertical angle.

32. The music score recognition system as claimed in claim 21, wherein the processing unit selects one of the at least one measure according to the recognition order, obtains the turning angle corresponding to the selected measure, and controls the lens of the image capturing apparatus to turn the turning angle to target on the center position of the selected measure, the image capturing apparatus zooms in the lens to capture an enlarged frame of the selected measure, and the processing unit recognizes the music information in the enlarged frame.

33. The music score recognition system as claimed in claim 21, wherein the music information comprises musical notes, clefs, rests, accidentals, time signatures, and dots.

34. The music score recognition system as claimed in claim 21, wherein the processing unit converts the music information of the captured measure to a sound file format and plays the music information converted to the sound file format.

35. The music score recognition system as claimed in claim 34, wherein the sound file format comprises a musical instrument digital interface (MIDI) format.

36. The music score recognition system as claimed in claim 21, wherein the processing unit converts the music information of the captured measure to a plurality of hardware signals and controls an electrical musical instrument to play the music information using the hardware signals.

37. The music score recognition system as claimed in claim 21, wherein the processing unit stores the music information as a temporary file corresponding to the captured measure.

38. The music score recognition system as claimed in claim 37, wherein the processing unit combines all of the stored temporary files as an information file corresponding to a complete music score.

39. The music score recognition system as claimed in claim 21, wherein the image capturing apparatus is a pan-tilt-zoom (PTZ) camera.

40. The music score recognition system as claimed in claim 21, wherein the music score is a piano score, a stringed instrument score, a wind instrument score, or a full score.

* * * * *